July 3, 1956     I. H. SWIFT     2,753,466
CURRENT TRAP FOR INTERCONNECTING TWO GENERATORS
Filed June 9, 1953
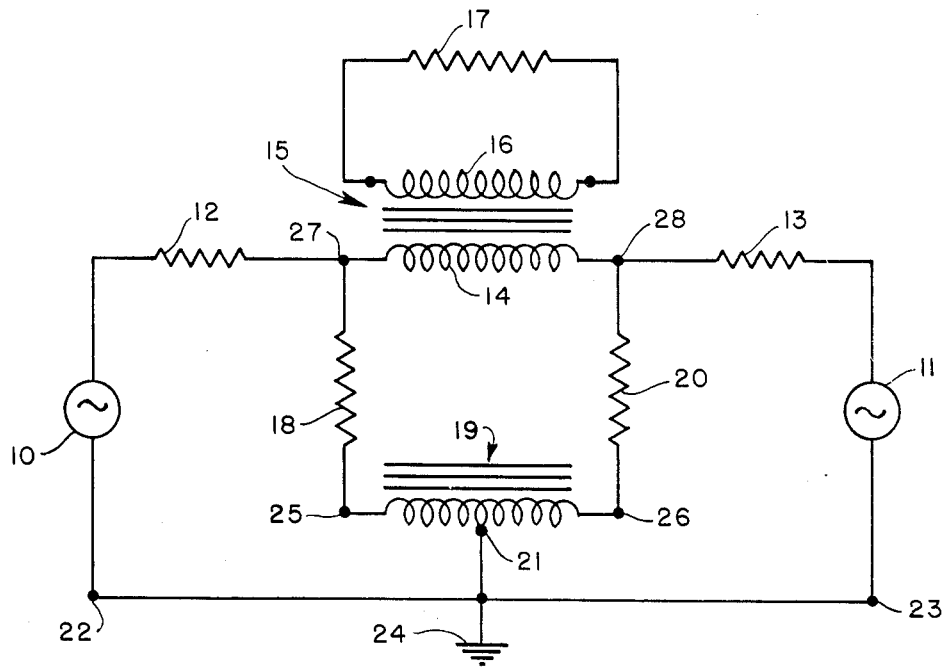
INVENTOR.
IRVIN H. SWIFT
BY
ATTORNEYS

United States Patent Office 2,753,466
Patented July 3, 1956

2,753,466
CURRENT TRAP FOR INTERCONNECTING TWO GENERATORS

Irvin H. Swift, Inyokern, Calif., assignor to the United States of America as represented by the Secretary of the Navy Application June 9, 1953, Serial No. 360,617

4 Claims. (Cl. 307—43)

(Granted under Title 35, U. S. Code (1952), sec. 266)

The invention described herein may be manufactured and used by or for the Government of the United States of America for governmental purposes without the payment of any royalties thereon or therefor.

This invention relates to electrical circuits and particularly to a current trap which prevents coupling between two generators supplying a common load.

When working with analogue computers, in particular, it is frequently necessary to connect two A. C. generators in series with a common load. Since each generator has an internal impedance, and since each generator will force current through the source impedance of the other, the current from one generator will cause a voltage drop across the source impedance of the other generator, which voltage drop will be at some phase angle relative to the voltage generated. Hence in general, the terminal, or output, voltages of the two generators will not have the same phase relationship as the voltages generated. While in some cases the phase difference between generated and output voltages of each generator may be compensated, more accurate computations can be made if such differences are not permitted.

It is, therefore, an object of this invention to provide an electrical circuit which will prevent a phase shift between the output voltage and the generated voltage of each of two A. C. generators, which generators have a common load impedance.

It is a further object to provide a current trap for two A. C. generators having a common load, which current trap prevents the current from each generator from flowing through the other generator.

It is another object to provide a circuit adapted to permit current from two generators to flow through a common load while preventing the current from each generator from flowing through the source impedance of the other generator.

Other objects and many of the attendant advantages will be readily appreciated as the same become better understood by reference to the following detailed description when considered in connection with the accompanying drawing in which there is illustrated a circuit diagram of the invention.

In the single illustration of the invention there is disclosed two sources of A. C. potential, or generators, 10, 11, which generate voltages $E_1$ and $E_2$ respectively. The frequencies and wave shapes of $E_1$ and $E_2$, respectively, are not restricted. Generator 10 has an internal impedance 12, and generator 11 has an internal impedance 13. The instantaneous value of the output voltage of generator 10 is $e_1$, and the instantaneous output voltage of generator 11 is $e_2$.

The common load of series connected generators 10, 11 is the primary coil 14 of transformer 15. The secondary coil 16 of transformer 15 has load impedance 17 of value $Z_d$ connected thereacross. Coils 14 and 16 have, respectively, $N_1$ and $N_2$ turns.

The current trap comprises an impedance 18, a center tapped autotransformer 19, and an impedance 20 which are connected in series to form a circuit. This circuit is then connected in parallel with primary coil 14 of transformer 15. Each of the impedances 18, 20 has a value substantially equal to $Z_d/2(N_1/N_2)^2$ which is one-half of the reflected value of load impedance 17. The center tap 21 of autotransformer 19 is connected between terminals 22, 23 of generators 10 and 11. The common connection between generators 10, 11 and center tap 21 of autotransformer 19 is then connected to ground 24.

There appears to be no simple explanation of why the circuit of the invention prevents current from source 10 from flowing through the source impedance 13 of source 11, for example. Therefore, a mathematical explanation of the operation of the invention is given.

The ends, or terminals, 25, 26 of center tapped autotransformer 19 are at equal and opposite potentials, as is known from transformer theory, therefore, the instantaneous potential of terminal 26 may be designated by the symbol $e$ and that of terminal 25 by $-e$. Also, the instantaneous currents $i$ in each half of the autotransformer 19 are equal, since it is assumed that the magnetization current is negligible. From this it follows that the instantaneous potential difference between terminal 27 and terminal 25 equals the instantaneous potential difference between terminal 28 and terminal 26. Therefore, if the instantaneous potential of terminal 27 be designated by $e_1$ and that of terminal 28 be $e_2$, then (1) $$e_1-(-e)=e_2-(e)$$

or (2) $$e=\frac{e_2-e_1}{2}$$

The current $i_1$ flowing from generator 10 to terminal 27 equals the sum of the current $i$ between terminal 27 and ground 24 and the current $i_d$ flowing through the primary coils 14 of transformer 15, or (3) $$i_1=i+i_d$$

From Ohm's law it is known that (4) $$i=\frac{e_1-(-e)}{Z_d/2(N_1/N_2)^2}=\frac{2(e_1+e)}{Z_d(N_1/N_2)^2}$$

where $Z_d/2(N_1/N_2)^2$ is the value of impedance 18, and (5) $$i_d=\frac{e_1-e_2}{Z_d(N_1/N_2)^2}$$

where the value of the impedance of coil 14 is the reflected impedance of load impedance 17, $Z_d(N_1/N_2)^2$. Therefore, (6) $$i_1=\frac{2(e_1+e)}{Z_d(N_1/N_2)^2}+\frac{e_1-e_2}{Z_d(N_1/N_2)^2}$$

(7) $$i_1=\frac{2e_1+2e+e_1-e_2}{Z_d(N_1/N_2)^2}$$

(8) $$i_1=\frac{3e_1-e_2+2e}{Z_d(N_1/N_2)^2}$$

Substitution of Equation 2 in Equation 8 yields, (9) $$i_1=\frac{3e_1-e_2+e_2-e_1}{Z_d(N_1/N_2)^2}$$

which can be simplified to

(10) $$i_1=\frac{2e_1}{Z_d(N_1/N_2)^2}$$

By circuit symmetry it can also be shown that $i_2$, the current flowing from generator 11 to terminal 28 is

(11) $$i_2=\frac{2e_2}{Z_d(N_1/N_2)^2}$$

From the foregoing it can be concluded that the current through source 10, for example, depends only on the voltage generated by source 10, and, therefore, there can be no phase shift of output voltage $e_1$ due to current from generator 11 flowing through internal impedance 12. By the same reasoning, there can be no phase shift of output voltage $e_2$ of source 11 due to current from generator 10 flowing through internal impedance 13. Hence phase shifts due to current from one generator acting on the source impedance of the other have been eliminated.

If $N_1=N_2$, transformer 15 can be eliminated, and load 17 can be connected directly between terminals 27 and 28 without changing the theory of operation of the circuit.

Obviously many modifications and variations of the present invention are possible in the light of the above teachings. It is therefore to be understood that within the scope of the appended claims the invention may be practiced otherwise than as specifically described.

What is claimed is:

1. An electrical circuit comprising a transformer having a primary coil and a secondary coil, the primary coil having two terminals, a load impedance connected across the secondary coil, first and second sources of A. C. potential, each source having two terminals, one terminal of the first source being connected to one terminal of the primary coil of the transformer and one terminal of the second source being connected to the other terminal of the primary coil of the transformer, the other terminals of the two sources being connected to each other, and a current trap comprising a first impedance, an autotransformer having a center tap, and a second impedance, said first impedance, autotransformer, and second impedance being connected in series, said current trap being connected in parallel with the primary coil of the transformer, the center tap of the autotransformer being connected to the connected terminals of the two sources.

2. An electrical circuit as defined in claim 1 in which the values of the first and second impedances each equals substantially one-half the value of the load impedance multiplied by the square of the ratio of the number of the turns of the primary coil to the number of turns of the secondary coil of the transformer.

3. Electrical apparatus comprising an output transformer; a current trap consisting of an auto-transformer center-tapped to ground and two equal transformer resistors each connected to opposite ends of said auto-transformer; a circuit connecting said auto-transformer in parallel with the primary winding of said output transformer through said transformer resistors; a load resistor connected to the secondary winding of said output transformer; and two alternating current sources each connected to one end of the primary winding of said output transformer.

4. An electrical apparatus as in claim 3 in which the values of the two equal transformer resistors each substantially equals one-half the value of the load resistor.

References Cited in the file of this patent

UNITED STATES PATENTS

| | | |
|---|---|---|
| 1,054,937 | Pfeffer | Mar. 4, 1913 |
| 1,651,869 | Champlin | Dec. 2, 1927 |
| 2,250,308 | Lindenblad | July 22, 1941 |